Jan. 26, 1926.  
F. H. BEYEA  
1,570,821  
MACHINE FOR THE MANUFACTURE OF BEAD CABLES OR GROMMETS  
Filed Sept. 23, 1921     3 Sheets-Sheet 1

Inventor  
Frank H. Beyea  
By   Atty.

Jan. 26, 1926. 1,570,821
F. H. BEYEA
MACHINE FOR THE MANUFACTURE OF BEAD CABLES OR GROMMETS
Filed Sept. 23, 1921 3 Sheets-Sheet 2
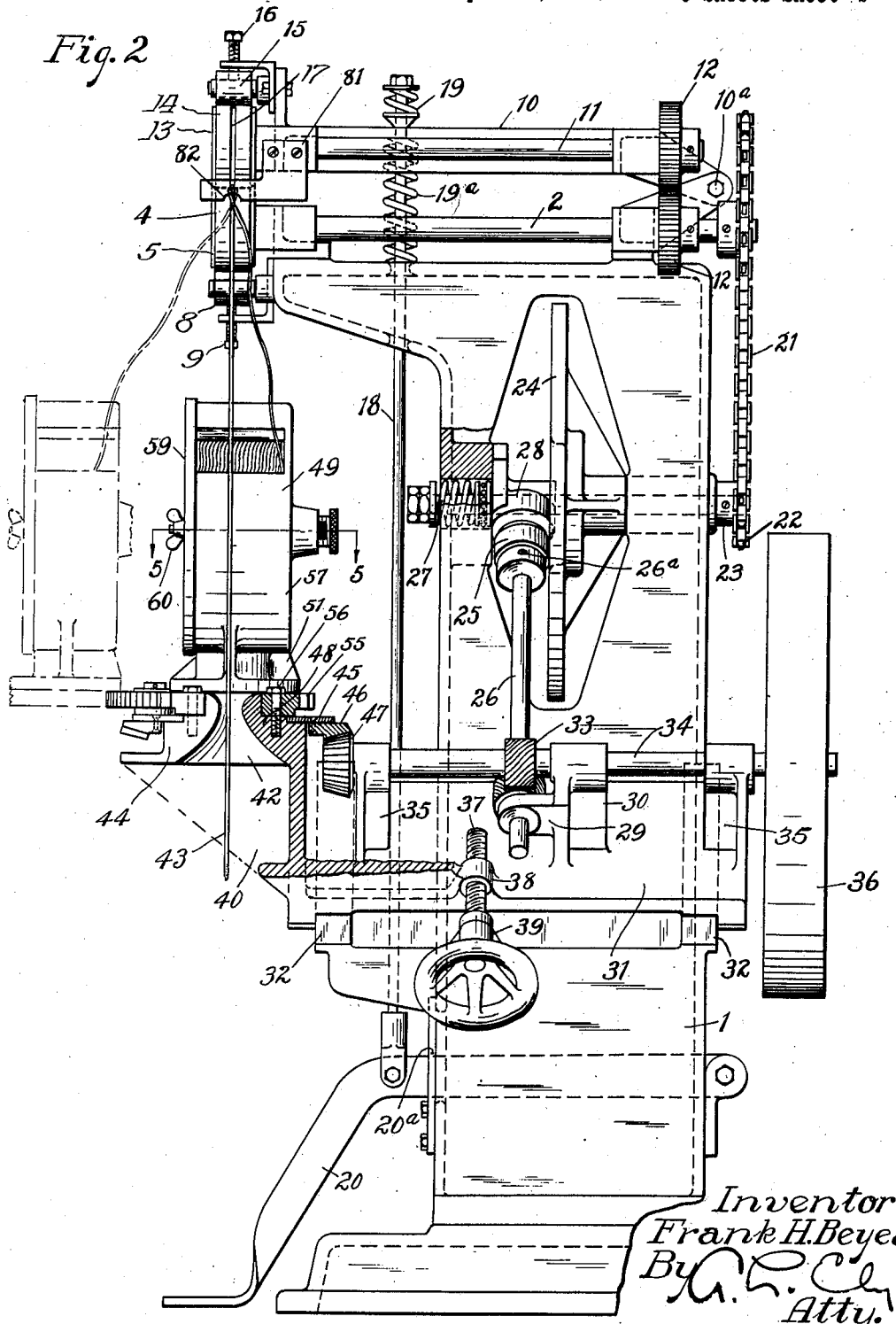

Jan. 26, 1926. 1,570,821
F. H. BEYEA
MACHINE FOR THE MANUFACTURE OF BEAD CABLES OR GROMMETS
Filed Sept. 23, 1921 3 Sheets-Sheet 3
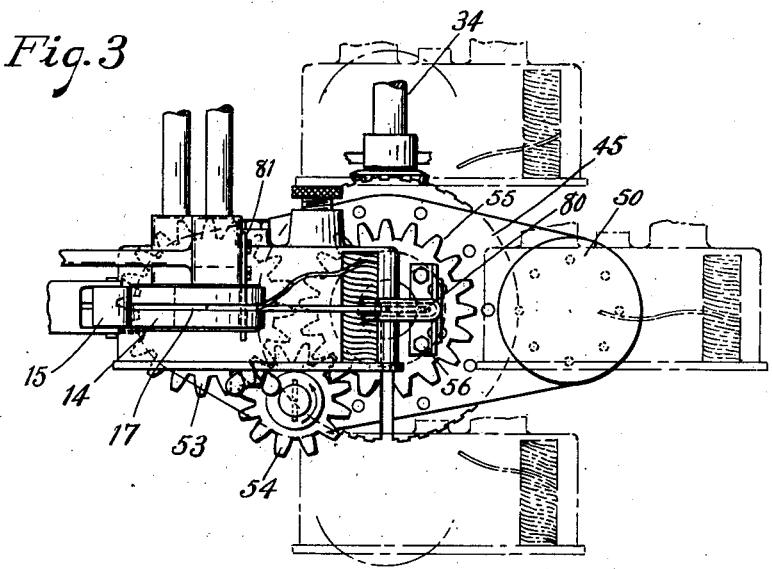
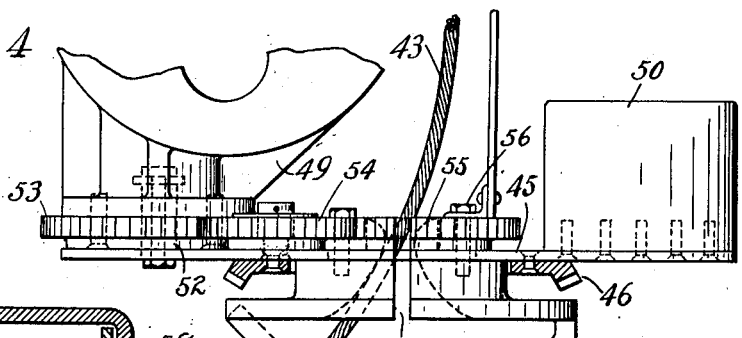
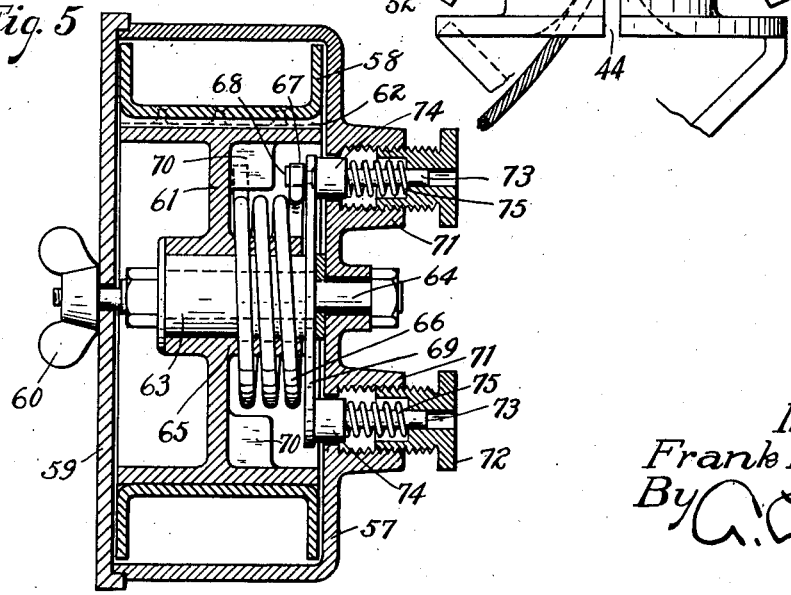
Inventor
Frank H. Beyea.

Patented Jan. 26, 1926.

1,570,821

UNITED STATES PATENT OFFICE.

FRANK H. BEYEA, OF AKRON, OHIO, ASSIGNOR TO JOHN R. GAMMETER, OF AKRON, OHIO.

MACHINE FOR THE MANUFACTURE OF BEAD CABLES OR GROMMETS.

Application filed September 23, 1921. Serial No. 502,819.

*To all whom it may concern:*

Be it known that I, FRANK H. BEYEA, a citizen of the United States, residing at Akron, in the county of Summit, State of Ohio, have invented certain new and useful Improvements in Machines for the Manufacture of Bead Cables or Grommets, of which the following is a specification.

This invention relates to a machine for the manufacture of endless circular cables or grommets from wire or the like, such cables or grommets being suitable for various uses, a special application for these cables or grommets being in the manufacture of beads for straight-side pneumatic tires.

In my prior applications Serial Nos. 472,623 filed May 26, 1921, and 499,305, filed Sept. 8th, 1921, I have shown and described certain processes invented by me for the manufacture of tire beads in which use is made of spirally formed covering wire which is wrapped about the grommet a plurality of times until the bead is completely built up of a plurality of spiral convolutions. My processes distinguish from those which have gone before them, in that the outer wire is crimped or spiralled prior to its assembly upon the spool or carrier from which it passes to the bead. In order to wrap the preformed spiral wire about the core wire it is necessary that the spool or carrier be passed in a peculiar manner about the core wire so as to prevent twisting of the wire, which would deform the spirals. Certain advantages are present in the process of preliminary spiralling the wire over previous processes which have spiralled the wire during or as a part of the wrapping operation. These advantages have been fully gone into in my prior applications aforesaid, the object of the present invention being to construct a machine which will wrap the spiralled wire about the bead or the central core wire, if such is used.

A further object of the invention is to construct a machine which will build an endless cable from wire, which machine is simple and easy to operate and will not be subject to breakage or disablement because of complicated or intricate parts.

Various other objects and advantages will be derived from the machine shown and described herein, it being understood that the showing is for the purpose of enabling one skilled in the art to practise the invention and it is not to be understood as limiting the invention to the exact form shown; as changes and modifications may be made without departing from the scope of the invention or sacrificing any of its benefits.

In the drawings:

Fig. 2 is a side elevation thereof.

Fig. 3 is a plan view of the spool or supply reel carrier.

Fig. 4 is a side elevation thereof.

Fig. 5 is a section through the spool carrier on the line 5—5 of Fig. 2.

Figure 1:
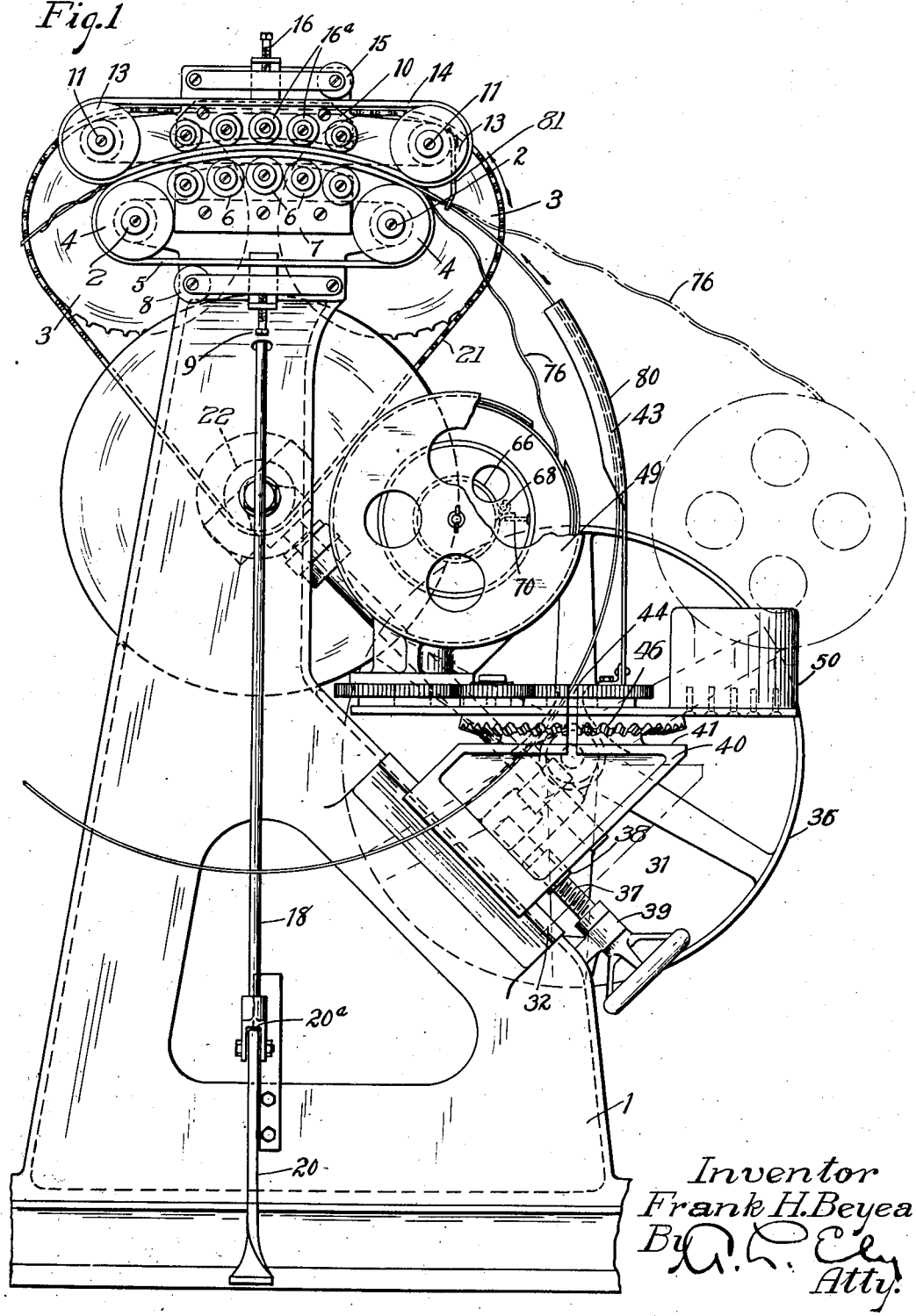
Fig. 1 is a front elevation of the machine.

The machine comprises a framework or standard 1 which supports the various parts of the machine, which parts comprise, generally, a core or bead supporting and rotating device and a spool or supply reel carrier.

The upper part of the standard supports bearing for a pair of parallel shafts 2, the rear ends of which carry sprockets 3 and the forward ends of which carry pulleys 4 around which is passed a bead or grommet supporting belt 5. The upper run of the belt 5 passes over a plurality of small idler pulleys 6 mounted on a plate 7 fastened to the front of the standard, the pulleys being arranged in the arc of a circle to carry the belt in a path approximating the upper portion of the circumference of the bead, on the lower run of the belt may bear an adjustable belt tightener 8 moved by a bolt 9 so as to keep the belt taut over the pulleys.

Above the shafts 2 is located a pivoted frame work 10, the rear end of which moves about the point 10ª as a center. In the frame 10 are arranged two parallel shafts 11 over and slightly at one side of the shafts 2, which shafts are driven from the shafts 2 by intermeshing pinions 12. The forward ends of the shafts 11 carry pulleys 13 located over the pulleys 4 and around these pulleys is trained a second belt 14 which contacts and travels with the belt 5 over its upper surface. A belt tightener 15 operated by an adjustable bolt 16 serves to keep the belt 14 tight. A number of rollers 16ª may be mounted on the front of the frame 10 over the rollers 6 to exert additional pressure on the upper belt. If desired, one of the belts here shown as the upper belt may be provided with a groove or otherwise, 17, to receive the grommet, and keep it from slipping out between the belts.

The rocking framework 10 carrying the upper pulleys and belt may be raised or lowered by a vertical rod 18, a spring 19 being interposed between the rod and the framework to afford resilient pressure on the belt 14, and an opposing spring 19a bearing against the lower side of the frame to raise same. A foot treadle 20 is provided to operate the rod, any suitable form of locking device or detent 20a being provided to engage the treadle 20 for the purpose of holding the framework down with the belts in contact.

The shafts 2 and 11 are driven by a sprocket chain 21 which passes over the sprockets 3 and over a sprocket 22, on the end of a shaft 23, rotatably housed in the framework 1. On the shaft 23 is keyed a disk 24 against the face of which bears a driving pulley 25 located on the upper end of a driving shaft 26 and held by a set screw 26a. The disk is pressed against the pulley 25 by a spring 27, in any suitable manner so as to provide frictional driving contact between these elements.

The upper end of the shaft 26 is received in a bearing 28 on the framework and the lower end in bearings 29 extending from a lug 30 which is formed on the upper surface of a plate 31 slidably mounted on inclined rails 32 on the framework. The shaft 26 is driven by worm or spiral gearing 33 from a shaft 34 mounted in bearings in the lug 30 and in the brackets 35 rising from the plate 31, the shaft having a pulley or other driving means 36.

The pulley 25 may be adjusted toward and from the center of the disk 24 in any preferred manner to obtain an adjustment of speed of the belts 14 and 5 to vary the travel of the bead or grommet to correspond with the pitch of the spiral in the covering wire. The sliding plate 31, which carries the wire reel or spool may be adjusted to different size beads by the screw shaft 37 which shaft engages a nut 38 on the plate 31 and is received in a collar 39 on the framework.

On the front of the plate 31 is formed a bracket 40, the upper surface 41 of which is horizontal and is provided with a funnel shaped aperture 42 through which the bead 43 moves, the bracket being provided with a slot 44 leading to the aperture through which the bead may be passed.

On the upper surface of the bracket 40, about a base 48, is rotatably mounted a plate or table 45, to the lower surface of which is secured a bevel gear 46 in mesh with a bevel pinion 47 on the end of the shaft 34. One side of the table 45 carries the supply reel or spool holder, indicated generally by the numeral 49 and the other side carries a balance or counter-weight 50. Motion derived from the shaft 34 will rotate the table 45 about the bead or grommet and wrap the covering wire over the bead, the bead being rotated simultaneously upon its own axis by the belts previously described. As the gearing is interdependent the wrapping will be evenly accomplished, the pitch of the covering spiral being determined by the adjustment of the friction drive.

As was stated in the opening portion of the specifications, the wire is preliminarily crimped or spiralled and is assembled in the machine on the supply reel or spool in this manner. Now as the spool is cast about the rotating bead, if the axis of the spool revolved relative to the plane of the bead the wire would be twisted or rotated about its own axis and the previously formed spiral would be distorted. In order to prevent this action, the supply spool is passed about the bead so that the usual planetary movement is avoided and the axis is maintained perpendicular to the plane of the bead at all times.

To accomplish this result, the spool carrier indicated by the numeral 49 is rotatably mounted on bearing 52 on the plate 45 and has secured near its lower side a gear 53 which meshes with an idler gear 54, on the plate, which in turn meshes with a gear 55 secured to the boss 48 by screws 56.

The gear 55 and the plate 45 have apertures and slots registering with the aperture 42 and slot 44 in the bracket 40. As the plate revolves it will be seen that the supply reel or spool is constantly maintained with its axis at right angles to the plane of the bead as indicated by the several dotted line positions shown in Figs. 2 and 3 and the wire will pass off the spool and on to the bead without twisting.

The spool holder 49 is formed with a circular enlargement or boss 57, open at one side, in which the spool or shell 58 carrying the supply of spiralled wire is received. The spool recess is covered by a plate 59 held in position by a centrally located wing nut 60. The spool is received over a drum 61, to which it is keyed as at 62, which drum is rotatably mounted on a sleeve 63 mounted on a shaft 64 centrally located in the boss 57.

It will be noted that, as the spool passes to the position at the outside of the head ring 43, as shown in dotted lines in Fig. 1, the wire is paid out and that as it passes to the position inside the bead slack will occur. To take up this slack the following arrangement is provided:

The spool 58 is keyed to the drum 61 and is loose on the sleeve 63. Around the hub 65 of the drum 61, is located a coil spring 66, one end of which is formed with an eye 67 located over a pin 68 projecting from the face of a disk 69 attached to the sleeve 63. The other end of the spring projects into the path of lugs or abutments 70 formed on the inside of the drum 61. In the rear of the casing 57 are arranged sockets 71 which are internally screw-threaded to receive plugs 72 in which are slidably mounted pins 73. These pins carry at the inner ends friction plugs 74 which bear against the face of the disk 69, being forced against the disk by springs 75, the pressure of the springs being regulated by the screw plugs 72.

As the pull is exerted on the wire 76, by the rotation of the bead core or grommet 43 and the outward movement of the spool the spool and the drum 61 will unwind by first winding or unwinding the spring 66 and when this has reached its limit the disk 69 will slip over the friction plugs 74. When the pull on the wire is relaxed the spring will regain its normal position, winding up the spool and taking up the slack in the wire. In order to guide the foundation or bead 43 and prevent it being displaced by the pull of the covering wire, I may mount on the stationary gear 55 a curved guide or horn 80 which extends upwardly from the gear to a point near which the wrapping operation takes place, the horn being curved longitudinally in general direction to conform to the bead and being curved laterally to partially surround the bead at the upper extremity of the horn. I may also attach to the forward portion of the frame 10 a guide bracket 81, a lateral extension of which is provided with a notch 82 which passes over the bead as it enters the opening between the two belts.

The operation of the machine will be easily understood from the following brief description: The upper belt 14 being raised by the treadle 20, the bead core 43 or other circular foundation is placed in position on the lower belt 5 and inserted within the aperture 42. The upper belt is then lowered, sufficient pressure being exerted through the treadle to grip the bead firmly. The machine is then started in operation and the belts will carry the bead around its axis, while the covering wire 76 is cast about the bead by the rotation of the spool or shuttle carrier 49. The spool is maintained with its axis in perpendicular relation to the plane of the bead by the gears 53, 54 and 55 and the slack is taken up by the spring device shown in Fig. 5. The wrapping of the wire 76 about the bead or center wire 43 occurs at approximately the intake point of the belts 4 and 14 and the cover is pressed and held in place by the belts. Adjustment for different size beads may be made by raising or lowering the plate 31 and the differences in pitch of the spiral will be taken care of by adjustments of the friction drive for the belts.

By the use of the machine described a perfect bead is formed from previously crimped or preformed spiral wire. After the covering wire is wrapped about the core the required number of times the covering wire is cut at the proper place and the bead core is ready for the finishing operations which are preformed before it is incorporated in the tire bead.

The invention is not limited to the exact form and arrangement of parts may be modified or varied within the scope of the invention.

Claims:

1. In a machine for the purpose set forth, the combination of means for supporting a grommet and a holder for preformed spiral wire, means for casting the holder about the grommet, means for rotating the holder and the grommet circumferentially relative to one another and means for maintaining the axis of the holder at a constant angle with respect to the plane of the grommet.

2. In a machine for the purpose set forth, the combination of means for supporting and rotating a circular foundation or grommet, a supply reel for covering wire, means for casting said reel about the grommet and means for preventing twisting or rotation of the wire as it is cast about the grommet.

3. In a machine for the purpose set forth, the combination of means for supporting and rotating a circular foundation or grommet, a supply reel for spiralled covering wire, means for casting said reel about the grommet, said reel being prevented from turning over during the casting operation, the wire passing from the reel to the grommet without twisting or spiralling.

4. In a machine for manufacturing endless cables, means for supporting and rotating the cable, a supply reel for covering wire, and means for wrapping the covering wire about the cable without twisting or spiralling.

5. In a machine for manufacturing endless cables, means for supporting and rotating the cable, a supply reel for covering wire and means for wrapping the covering wire about the cable in a succession of spiral convolutions, without spiralling the wire during the wrapping operation.

6. In a machine for manufacturing an endless cable having an outer wire wrapped therearound in a plurality of spiral convolutions, means for supporting and rotating the cable, a supply reel for the wire, means for casting the supply reel about the wire and means for maintaining the supply reel with its axis perpendicular to the plane of the cable at all times during the casting operation.

7. In a machine for manufacturing an endless cable having an outer wire wrapped therearound in a plurality of spiral convolutions, means for supporting and rotating the cable, a supply reel for the wire, means for casting the supply reel about the wire, a rotary mounting for the supply reel and means connected with said mounting to rotate the same, so as to prevent the axis of the spool from turning with respect to the plane of the cable during the casting operation.

8. In a machine for manufacturing an endless cable having an outer wire wrapped therearound in a plurality of spirals, a supply reel for the wire, means for rotating the supply reel relative to the cable, means for casting the supply reel about the cable, a rotary mounting for the supply reel and means connected with said mounting to maintain the axis of the spool at a fixed angle with respect to the plane of the cable.

9. In a machine for manufacturing an endless cable having an outer wire wrapped therearound in a plurality of spirals, a supply reel for spirally formed wire, means for rotating the supply reel relative to the cable, to draw the spiralled wire from the reel, said wire passing to the cable without twisting.

10. In a machine for manufacturing an endless cable having an outer wire wrapped therearound in a plurality of spirals, a supply reel for spirally formed wire, means for rotating the supply reel relative to the cable to draw the spiralled wire from the cable, said wire passing to the cable without twisting or spiralling.

11. In a machine for manufacturing an endless cable having an outer wire wrapped therearound, in a plurality of spiral convolutions, a supporting and rotating means for the cable, a supply reel for the wire, a rotating support for the reel, the axis of the support being at the cable, said supply reel being mounted for rotation on the support, a stationary gear and means connecting the gear with the reel to prevent the latter from turning during the rotation of the support.

12. In a wrapping machine for forming endless cables, a supporting and rotating means for the cable, a rotary table adapted to have a cable pass through its axis, a supply reel for covering wire rotatably mounted at one side of the table, a stationary gear located at the center of the table, a gear attached to the supply reel and an intermediate idler gear between the stationary gear and the gear on the reel.

13. In a machine for manufacturing endless cable having an outer wire wrapped therearound in a plurality of spiral convolutions, a supporting and rotating means for the cable, a supply reel for spirally formed wire, a rotating support for the reel, the axis of the support being at the cable, said supply reel being mounted for rotation on the support, means for turning said supply reel on its support to maintain the axis thereof perpendicular to one diameter of the cable at all times, said wire passing to the cable without further spiralling.

14. In a machine for manufacturing endless cables, the combination of means for wrapping a covering wire about the cable and supporting and rotating means for the cable, said last named means comprising a pair of contacting belts between which the cable passes.

15. In a machine for manufacturing endless cables, the combination of means for wrapping a covering wire about the cable and supporting and rotating means for the cable, said last named means comprising a pair of contacting belts and means to apply pressure to said belts to grip the wire between the belts.

16. In a machine for manufacturing endless grommets means for supporting and rotating a grommet comprising a pair of belts to receive the grommet, said belts being held in contact and arched to conform to a portion of the circumference of the bead.

17. In a machine for manufacturing endless grommets means for supporting and rotating a grommet comprising a pair of belts to receive the grommet, said belts being held in contact and arched to conform to a portion of the circumference of the bead, and means to exert yielding pressure on said belts.

18. In a machine of the character described, the combination of a standard, a belt rotatably mounted on the standard, a movable frame on said standard, a second belt on said frame, said frame being movable to bring the two said belts in contact to support and rotate a grommet.

19. In a machine for manufacturing endless cables, a standard, a belt rotatably mounted on the standard, means to arch said belt to conform to and receive a portion of the bead, a rocking frame, a second belt on said frame adapted to be brought in contact with the first named belt and means to raise and lower said frame.

20. In a machine for manufacturing endless cables, the combination of means for wrapping a wire about the cable and supporting and rotating means for the cable, said last named means comprising a pair of contacting belts to receive a cable and means to prevent the cable from displacement laterally of said belts.

21. In a machine for manufacturing endless cables, the combination of means for wrapping a wire about the cable, and supporting and rotating means for the cable, said last named means comprising a pair of contacting belts to receive a cable and a groove in one of said belts to prevent lateral shifting of the cable.

22. In a machine for manufacturing endless cables, the combination of means for wrapping a wire about the cable and means to receive the cable directly after the wrapping operation, said last named means comprising a plurality of travelling members arranged in an arc to follow a portion of the circumference of the bead.

23. In a machine for manufacturing endless cables, the combination of means for wrapping a wire about the cable and means to receive the cable directly after the wrapping operation, said last named means comprising a plurality of travelling members arranged in an arc to follow a portion of the circumference of the bead and confining the wire about the cable over said arc.

24. In a machine for manufacturing endless cables, the combination of means for wrapping a spirally formed wire about the cable and means to receive the cable directly after the wrapping operation, said last named means comprising a plurality of travelling members arranged in an arc to follow a portion of the circumference of the bead, and confining the spiral turns about the wire over said arc.

25. In a machine for forming an endless cable of spiral wire wrapped in a plurality of convolutions about the cable, a supply spool for the wire, means for casting the spool about the wire and means for taking up the slack in the wire as it passes from outside the cable to within the cable.

26. In a machine for forming an endless cable, of spiral wire wrapped in a plurality of convolutions about the cable, a supply spool for the wire, means for casting the spool about the wire and spring operated means for rewinding the spool to take up the slack therein as the spool approaches the center of the cable.

27. In a machine for forming an endless cable, a supply spool for the wire, means for casting the spool into and out of the cable, the wire passing from the spool to the cable a spring associated with the spool said spring operating to wind up the spool as it approaches the center of the cable.

28. In a machine of the character described, a supply spool, means for casting the supply spool in a circular path into and out of a revolving ring, the material from the spool passing to said ring, a friction retarding device for the spool, a spring adapted to be wound by the drawing off of the material from the spool and operating to rewind the spool as slack occurs in the material.

29. In a machine of the character described, a supply spool for covering wire, a device for rotating an endless cable, means for casting the supply spool about the cable and automatically operating means to take up the slack in the wire as the spool approaches the center of the cable.

FRANK H. BEYEA.